May 6, 1958

W. C. LARSEN 2,833,239

DEVICE FOR HOLDING SOLDER

Filed Nov. 24, 1954

INVENTOR.
WILMER C. LARSEN

BY

ATTORNEYS

United States Patent Office 2,833,239
Patented May 6, 1958

2,833,239

DEVICE FOR HOLDING SOLDER

Wilmer C. Larsen, Fairmont, Minn.

Application November 24, 1954, Serial No. 470,943

3 Claims. (Cl. 113—111)

This invention relates to a new and improved device for holding solder. More particularly, this invention relates to a forceps-like tool for holding and feeding fine solder such as is used in the dental arts, such as orthodontia, the jewelry arts and other uses where delicate soldering operations are required.

The principal tool presently employed for this fine work consists simply of conventional dental pinch-type forceps and is subject to some obvious disadvantages. Fine solder, such as is used in dental technology, for soldering bars, clasps and tongs and the like, is normally in the shape of elongated thin narrow strips or rods. When held in ordinary forceps this rod has no lateral stability because it tends to pivot between the jaws of the forceps. For this reason it is difficult to apply positive pressure to the solder to press it against the work. Because of the absence of any holding means other than thumb and finger pressure the grip on the solder is lost if that pressure is relaxed or if the forceps are laid aside for any reason, and two hands are then required to right the solder in the forceps again. Because shifting of the work is frequently required it is often necessary to lay the solder and forceps down. There is generally a narrow precise range of heating of the work when solder must be applied to produce a satisfactory bond. This is especially true when soldering to over arch or lingual Wipla bar material. ("Wipla" is the tradename of a heavy orthodontia wire used in the dental profession.) It is imperative that there be no interruptions at this point of soldering. Thus, if it becomes necessary to set the forceps down, the critical time may be passed and a delay caused thereby. When it becomes necessary to feed additional solder to the work, once again two hands are required, one to hold the forceps and the other to move and reposition the solder.

It is the principal object of this invention to obviate the above enumerated disadvantages by providing a tool for holding fine solder having means for holding the solder stably and under continuous pressure while at the same time permitting easy adjustment of the exposed working length of the solder.

Another object of this invention is to provide a device for holding solder which is of simple construction and operation which will retain its hold on the solder even though laid aside without continued finger pressure.

A further object of this invention is to provide a device for holding solder which will allow full pressure on the solder against the work.

It is a still further object of this invention to provide a solder holding tool which allows the operator to secure a renewed grip on the solder as it is being used without danger of dropping the solder.

Other objects of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings wherein the same numerals are used to designate corresponding parts and in which:

Figure 1 is a side elevation of the solder holding tool of this invention;

Figure 2 is an end elevation, partly broken away, of the device;

Figure 3 is an enlarged detail view, partly broken away, of one form of solder holding means of the device;

Figure 4 is a fragmentary side elevational view of a modified form of the invention;

Figure 5 is a fragmentary side elevation of a further modified form of the invention; and Figure 6 is a sectional view taken along the line 6—6 and in the direction of the arrows of Figure 5.

Referring now to the drawings and particularly to Figures 1, 2 and 3, there is shown here one form of the invention. The solder holding device comprises a pair of opposed forceps-like arms indicated generally at 10 and 11, held together at one end so that the attached ends of the arms are aligned in generally parallel side-by-side relation. To provide resiliency in the device the arms are preferably generally flat, formed of metal such as steel with a slight central outward bow and welded together on opposite sides of a block 12. The lower narrower end 14 of arm 10 and the lower narrower end 15 of arm 11 are displaced slightly, generally on opposite edges of the arms, to permit crossing over of the arms to provide a tensioned self-closing action on the jaws of the device. Lower arm 15 has a pronounced reverse bow or curve terminating in a point 16 which is generally normal to arm 14. The lower end 14 of arm 10 is provided with a pair of generally parallel and slightly spaced apart projections 17 and 18 extending generally angularly downwardly and outwardly with respect to the axis of arm 10. Each of projections 17 and 18 is provided with a central opening or eye 19 and 20, respectively, generally in the same plane as the arm 10. Openings 19 and 20 are aligned to form a channel to receive a strip or rod 21 of fine solder and hold it at a proper angle for working. A second opening 22 is provided in projection 17 communicating with and transverse to opening 19. Opening 22 is positioned to receive point 16 of arm 11. Point 16 being under normal spring tension thus serves to grip the solder strip 21 and hold it in place against longitudinal movement.

Because of the crossed-over relation of the lower arm ends 14 and 15 the tips of these arms are under continuous resilient tension urging them closed. Grasping arms 10 and 11 with the fingers anywhere above the cross-over point and applying slight pressure, separates the jaws of the device and removes point 16 of lower curved arm 15 from contact with the solder. This permits easy insertion, adjustment and removal of the solder strip. When the working end of the solder is resting against a surface, such as shown in Figure 1, any length of solder can be fed downwardly against the work or other surface simply by releasing the pressure on the jaws of the device and lifting the holder the desired distance. Desirably a stop 24 is provided to limit the path of travel of point 16 to just enough to facilitate insertion, adjustment and removal of solder strip 21.

Positive thumb and finger pressure may be applied to hold the solder 21 firmly so that it may be pressed against the work when required. Two opposed thumb and finger grips 25 and 26 are provided on arms 10 and 11 respectively. It will be readily understood that which grip is grasped by the thumb and which by the finger depends upon the hand in which the device is held. Grip 25 is rigidly attached by a perpendicular pin 27 to arm 10, pin 27 passing through an opening 28 in arm 11. Grip 26 is displaced slightly from grip 25 and is rigidly attached to arm 11 by pin 29 which passes through opening 30 in arm 10. Pressure applied to the thumb and finger grips urges arms 10 and 11 apart. This force is transmitted through the crossed-over lower arms 14 and 15 and urges point 16 more tightly against the solder strip 21 inserted through openings 19 and 20 in the arm projections 17 and 18.

An alternative form of the invention is shown in Figure 4. Arm projection 18A of arm 10 in this modified form is adapted at its outer end to receive a sleeve or collar clip 31 having a plurality of spring-like prongs 32 projecting from the perimeter of clip 31. Prongs 32 are adapted to receive a carbon puddler 34. With this form of the invention the molten solder may be puddled without the necessity of laying down the solder holder and picking up a separate puddler. At the same time, the puddler is so affixed as not to interfere with the soldering operations.

A further modification of the invention is shown in Figures 5 and 6. In this form of the device a modified jaw member 35 is positioned at the lower end of arm portion 14 extending generally angularly downwardly and outwardly. Jaw member 35 is provided with an elongated longitudinal slot 36 open toward the opposed other lower arm member 15. Slot 36 is so aligned as to hold a strip of solder 21 at the proper working angle. Opposing arm member 15 is provided with a gripping element 37 adapted to fit in slot 36 and hold the solder strip firmly in place. The same stability, ease of inserting, adjusting and removing the solder strip is present in this form of the device and the same positive pressure can be applied.

In all forms of the invention there is provided a device for holding solder for dental work and other fine soldering operations which holds the solder firmly and stably when in use, which permits the tool to be laid down without losing its grip on the solder, which permits positive pressure to be exerted on the solder against the work and to permit feeding of the solder during the soldering operation.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A device for holding solder for fine soldering operations which comprises a pair of opposed arms attached together at one end, the lower ends o fsaid arms being narrower than the main portion of said arms and displaced on opposite edges of said arms with a slightly inwardly curved bow permitting the lower arm portions to cross over and return with tips of said lower arm portions in opposed relation, stable holding means for strip solder disposed on the tip of one of said arms comprising elongated stabilizing channel means disposed at an acute angle with respect to the axis of said arm, gripper means on the opposed tip of the other arm normally tensioned against the solder holding means to firmly hold solder therein and positive pressure applying means comprising slightly longitudinally displaced pins affixed to the insides of the opposed arms, each pin passing through an opening in the opposite arm and terminating in a finger gripping member on the outer side of the opposite arm.

2. A device for holding solder for fine soldering operations which comprises a pair of opposed arms attached together at one end, the lower ends of said arms being narrower than the main portion of said arms and displaced on opposite edges of said arms with a slightly inwardly curved bow permitting the lower arm portions to cross over and return with the tips of said lower arm portions in opposed relation, stable holding means for strip solder disposed on the tip of one of said arms comprising elongated stabilizing channel means disposed at an acute angle with respect to the axis of said arm and gripper means on the opposed tip of the other arm normally tensioned against the solder holding means to firmly hold solder therein, said solder holding means comprising at least two spaced apart generally parallel projections on one of said arms extending downwardly and outwardly from the axis of said arm an opening in each of said projections, said openings being aligned to form a solder receiving channel, a connecting opening in one of said projections normal to the first opening, said connecting opening being positioned to receive the gripping means of said opposed arm.

3. A device for holding solder for fine soldering operations which comprises a pair of opposed tensioned first and second forceps-like arms attached together at one end, the lower ends of said arms being narrowed and displaced on opposite edges of said arms with a slightly inwardly curved bow permitting the lower arm portions to cross over, the second of said lower arm portions also having a slightly curved outward bow at its lower extremity returning the end of that arm in opposed tension relation with respect to the first arm, stable holding means for strip solder disposed on the end of said first arm and solder gripping means on said second arm, said solder holding means comprising a pair of spaced apart generally parallel projections extending downwardly and outwardly from the axis of said arm, an opening in each of said arm projections, said openings being aligned to form an elongated stabilizing solder-receiving channel at an acute angle with respect to the axis of said arm, a connecting channel in one of said projections normal to the first opening, said second opening being positioned to receive the tensioned gripping means of said opposed second arm, positive pressure applying means comprising centrally disposed slightly spaced apart pins affixed to the insides of the opposed arms, an opening in each arm opposite the opposed pin, each pin passing through the opening in the opposite arm and terminating in a finger gripping member on the outer side of the opposite arms.

References Cited in the file of this patent

UNITED STATES PATENTS

| | | |
|---|---|---|
| 458,546 | Fisher | Aug. 25, 1891 |
| 1,133,334 | Strycker | Mar. 30, 1915 |
| 1,174,004 | Greenwald | Feb. 29, 1916 |
| 1,545,693 | Phoel | July 14, 1925 |
| 1,589,674 | Bearson | June 22, 1926 |
| 1,758,490 | Aderer | May 13, 1930 |
| 1,795,256 | Johnson | Mar. 3, 1931 |
| 1,979,528 | Bruce et al. | Nov. 6, 1934 |
| 2,214,984 | Bachmann | Sept. 17, 1940 |
| 2,595,683 | LoMonte | May 6, 1952 |
| 2,651,276 | Kristen | Sept. 8, 1953 |
| 2,677,039 | Clark | Apr. 27, 1954 |
| 2,737,917 | Steele | Mar. 13, 1956 |